United States Patent [19]
Fromknecht

[11] 3,909,219
[45] Sept. 30, 1975

[54] VACUUM CLEANER FILTER ASSEMBLY

[75] Inventor: Charles Thomas Fromknecht, Anderson, S.C.

[73] Assignee: The Singer Company, New York, N.Y.

[22] Filed: Jan. 3, 1973

[21] Appl. No.: 320,801

[52] U.S. Cl. .................. 55/216; 55/378; 55/381; 55/502; 55/DIG. 2; 55/DIG. 3
[51] Int. Cl.² ................ B01D 46/44; B01D 29/14
[58] Field of Search ............ 55/215, 216, 214, 378, 55/379, 381, 380, 497, 467, 471, 472, 502, DIG. 2, DIG. 3, 373, 363; 15/327 A, 319, 353

[56] References Cited
UNITED STATES PATENTS

| | | | |
|---|---|---|---|
| 956,784 | 5/1910 | Templin | 55/472 X |
| 1,390,966 | 9/1921 | Beth | 55/377 X |
| 2,555,452 | 6/1951 | McIntyre | 55/216 |
| 2,731,103 | 1/1956 | Ortega | 15/353 X |
| 2,814,064 | 10/1957 | Montgomery | 55/472 |
| 3,074,217 | 1/1963 | Sheps et al. | 55/216 |
| 3,104,762 | 9/1963 | Lahive | 248/99 X |
| 3,327,937 | 6/1967 | Casady | 248/99 X |
| 3,621,641 | 11/1971 | Takei et al. | 55/500 X |

FOREIGN PATENTS OR APPLICATIONS
245,148  12/1925  United Kingdom.................. 55/472

Primary Examiner—Frank W. Lutter
Assistant Examiner—N. Greenblum
Attorney, Agent, or Firm—Marshall J. Breen; Chester A. Williams, Jr.; Alan Ruderman

[57] ABSTRACT

A filter assembly for utility type vertical axis vacuum cleaner comprising three separate members- a substantially cup-like fabric filter including a resilient upper peripheral edge, a rigid hoop about which the upper edge of the filter is fitted, a polyvinylchloride seal fitted about the upper rim of the hoop. Also disclosed is a wet/dry utility vacuum cleaner having an open top dirt receptacle and a power suction module including a housing supporting a motor-blower unit in the receptacle and having a liquid sensing air shut-off device depending from the housing. An embodiment of the filter assembly is mounted in the receptacle with the seal interposed between mating peripheral edges of the receptacle and the housing, and includes a hole in the bottom of the filter through which the sensing element protrudes.

7 Claims, 4 Drawing Figures

U.S. Patent  Sept. 30,1975  Sheet 2 of 2  3,909,219

VACUUM CLEANER FILTER ASSEMBLY

BACKGROUND OF THE INVENTION

This invention relates to utility suction cleaners and more particularly to an improved filter assembly therefor and a combination of a wet/dry cleaner and a filter assembly.

It is known to include in utility vacuum cleaners having a vertical axis dirt storage receptacle a substantially cup-like secondary filter depending into the receptacle and supported at its upper periphery between the top of the receptacle and a mating rim of the power suction module. In this manner the filter maintains the dirt in the receptacle and protects the motor-blower of the module from contact with dirty air. Generally, in this type of cleaner arrangement, the filter is provided with a peripheral seal which fits between the mating edges of the receptacle and the housing to prevent suction loss in the cleaner. A cleaner of this type is disclosed in co-pending U.S. patent application Ser. No. 133,655 filed Apr. 13, 1971 now U.S. Pat. No. 3,732,667. It has, however, been determined that since the secondary filter is fabric and the seal is a flexible resilient rubber-like material, it is often difficult to properly seat the seal on the periphery of the receptacle with the result that suction losses have been noted. Furthermore, these cleaners use primary filters between the receptacle and the secondary filter and in some designs, such as that disclosed in the aforesaid U.S. patent application, the paper must be wrapped about the cloth and secured in position by turning its peripheral edges inwardly over the seal. The flimsiness of the secondary filter structure makes this assembly difficult to perform properly.

Another vacuum cleaner filtering problem which has evolved is that associated with utility cleaners of the above noted type which further inlcude the ability to vacuum up not only dry dirt but also have the capability of vacuuming liquids and/or foam by using an air shut-off mechanism generally including a float sensor. A cleaner of this type is disclosed in co-pending U.S. patent application Ser. No. 320,802 filed on even date herewith, now U.S. Pat. No. 3,815,172. These wet/dry cleaners although using by-pass type motor-blower units in which the motor is cooled by a different and separate airstream from the working airstream, must still provide filtering protection for the blower against harmful particles and prevent dirty working air from being exhausted from the blower to the room. A cloth secondary filter without the paper primary filter has generally been used for such cleaners when operating in the wet mode. The prior art filters, however, have been designed to surround the liquid sensing element, which then does not effect an air shut-off until the filter has been sitting in the liquid. The filter thus becomes a dirty sloppy sopping mess and must be removed and washed at great inconvenience.

SUMMARY OF THE INVENTION

It is therefore an object of this invention to provide a filter assembly of the above type which is sufficiently rigid to be installed easily between the periphery of a receptacle and the mating portion of a power suction module.

Another object of this invention is to provide a filter assembly of this type which can be used in combination with a wet/dry vacuum cleaner wherein the filter is prevented from contacting the liquid and/or foam collected in the receptacle while performing its function of protecting the air moving motor-blower unit.

The present invention achieves these objects by providing a filter assembly comprising a cup-like fabric filter having a resilient upper peripheral edge, a rigid hoop about which the resilient edge is positioned, and an annular seal disposed about the hoop above the filter and adapted to seat between mating edges of a receptacle and power suction module housing. The invention further provides a wet/dry cleaner having an air shut-off device including a liquid and foam sensor depending from the suction module into the receptacle and a filter assembly having an aperture in the bottom thereof through which the sensor protrudes.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
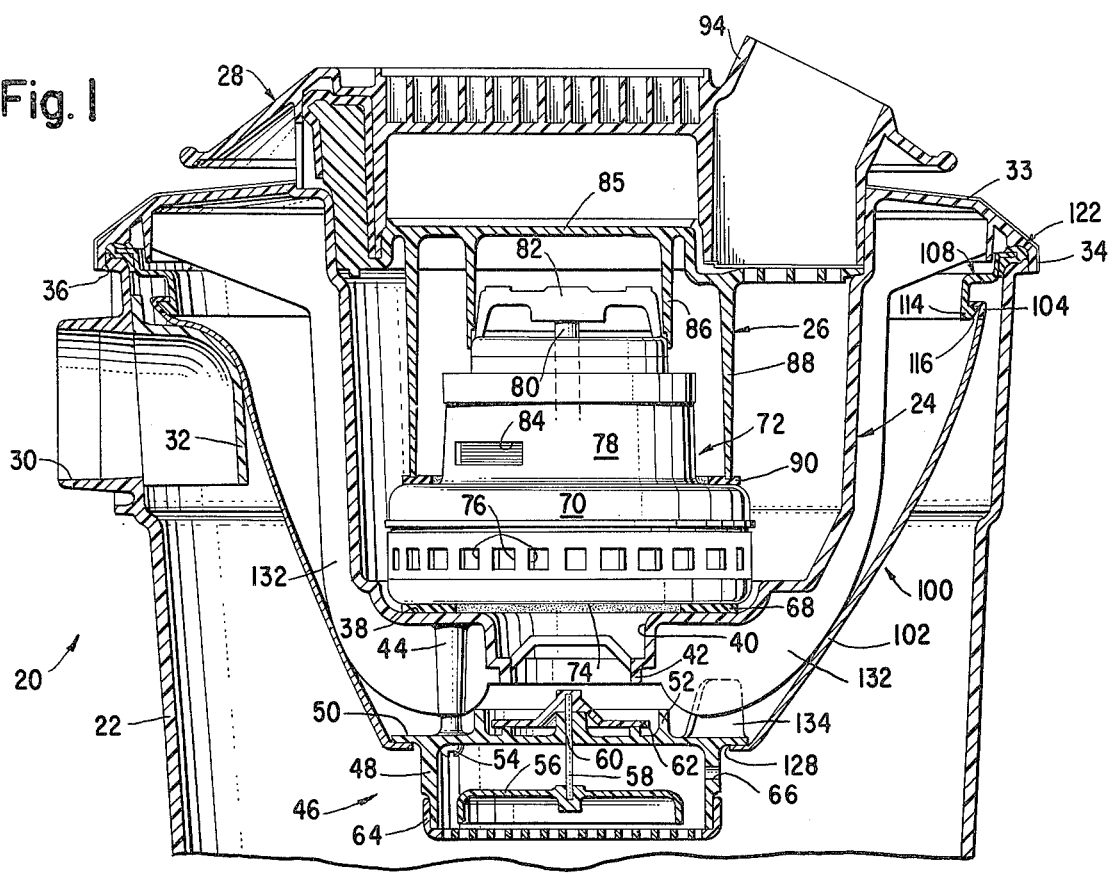
FIG. 1 is a vertical cross-sectional view of a wet/dry vacuum cleaner incorporating an air shut-off device and a filter constructed in accordance with the present invention.

Referring now to the accompanying drawings wherein like reference numerals denote similar parts throughout the various views, there is disclosed in FIG. 1 a utility vacuum cleaner having wet and dry capabilities of the type disclosed in co-pending U.S. patent application Ser. No. 320,802 filed on even date herewith, now U.S. Pat. No. 3,815,172, and incorporating the new and improved filter assembly of the present invention. The cleaner generally designated as 20 comprises an open top substantially cylindrical dirt receptacle 22 and a power suction module comprising a lower or first housing 24, a separator or second housing 26, and a top or third housing 28. A complete description of the cleaner may be had by reference to the aforesaid co-pending Patent Application filed on even date herewith. Formed adjacent to the open end of the dirt receptacle 22 is an air suction inlet conduit 30 opening into the receptacle and adapted to couple a conventional vacuum cleaner hose (not shown) in the usual manner. Preferably, a styrene baffle 32 may be mounted behind the inlet aperture defined by the conduit 30. The baffle can be shaped to direct the inlet air and liquid downwardly and circumferentially away from the filter assembly toward the lower inside walls of the receptacle.

The lower housing 24 is substantially cup shaped having a peripheral flange 33 including a peripheral rim 34 substantially corresponding in shape to the periphery of the top of the dirt receptacle, and includes at its underside an angular groove 36 for mating with the top peripheral portion of the dirt receptacle as hereinafter described. In this manner the lower housing is supported on the dirt receptacle with the cup-shaped portion of the housing nested therein, and the housing is detachably secured to the receptacle in the same manner as described in the aforesaid co-pending patent application Ser. No. 133,655. At the bottom of the housing 24 there is formed a substantially flat circular seating portion 38 having an aperture 40 formed centrally therein with a downwardly extending neck 42 communicating with the interior of the dirt receptacle. A number of threaded bosses 44 (only one of which is shown) are molded on the bottom of the housing 24 radially outwardly from the aperture 40 for supporting an air shut-off mechanism generally indicated as 46.

The air shut-off mechanism comprises a substantially cylindrical valve housing 48 extending downwardly from a flanged disc portion 50. A short upstanding cylindrical wall 52 extends upwardly from the disc surface 50 of the housing assembly. Mounting screws 54 pass into the bottom of the disc 50 and are threadedly received into the bosses 44 to secure the air shut-off assembly 46 to the housing 24. An inverted cup-shaped plastic float valve 56 having a short metal rod 58 centrally secured to the upper surface thereof, is positioned within the housing 48. The rod 58 extends through a substantially central opening 60 in the surface of the disc 50 and is secured at its upper end to a valve member 62 adapted to close off the airflow to the aperture 40. The float 56 is made of a light weight polyethylene material and is capable of floating not only on liquids but also may be lifted due to surface tension and buoyancy effects by foam. When the level of liquid and/or foam in the receptacle thereto reaches a predetermined level, the float 56 moves upwardly until the valve 62 seats against the bottom of the neck 42 to shut-off the airflow to the aperture 40. A grid type guard 64 is fitted around the bottom of the housing 48 to protect the float 56 against the entry of large dirt particles and also to protect the float against contact with a paper primary filter (not shown) used when the cleaner is operated in the dry mode only. A hole 66 is provided in the upper portion of the housing 48 so as to allow the escape of air from the interior of the housing 48 when the liquid level in the receptacle rises. If air were trapped within the chamber of the interior of the housing water could be prevented from entering and the float sensor 56 would fail to properly activate the air cut-off disc valve 62.

Mounted on an annular seal 68 in the seat 38 is the blower portion 70 of a by-pass motor-blower unit generally designated as 72. A by-pass motor-blower is one in which an airstream separate from the working airstream is utilized to cool the motor. The blower has a centrally disposed inlet 74 positioned in communication with the aperture 40, and includes a plurality of openings 76 tangentially disposed about the cylindrical housing. Mounted vertically above the blower 70 is the motor portion 78 of the motor-blower unit. A motor-blower shaft 80 is journaled at its upper end in a yoke member 82 and in its lower end in the blower wheel (not shown) of the blower unit. The motor armature (not shown) is secured to the shaft 80 and provides the power to drive the blower. Two cooling air exhaust apertures 84 (only one of which is shown) may be formed in the lower portion of the motor casing. The upper portion of the motor just beneath the yoke 82 is open for receiving the cooling air and preferably has a small cooling fan secured to the shaft 80 just below the yoke for providing positive cooling to the motor core and armature.

The separator housing 26 includes a floor 85 which may be secured to the yoke 82 of the motor-blower unit as described in the aforesaid co-pending Patent Application filed on even date herewith. Extending downwardly from the floor of the housing 26 is an interior substantially cylindrical annular wall 86 and an outer cylindrical longer annular wall 88. The outer wall 88 engages a seal 90 which abuts the upper surface of the blower housing while the inner wall 86 engages the upper portion of the motor housing just below the yoke. The cup-shaped housing 24 and the downwardly extending annular wall 88 define therebetween a blower exhaust chamber communicating with the blower ports 76, while the walls 86 and 88 of the housing define therebetween a motor cooling air exhaust chamber for receiving cooling air exhausted through the openings 84. The third housing 28 is secured by screws (not shown) to the lower housing 24 to secure the housings 28 and 24 together and entrap the separator housing 26 and motor-blower unit in position therebetween. An upwardly projecting annular wall 94 of the top housing 28 defines a blower exhaust port of the vacuum cleaner and communicates with the blower exhaust chamber between the wall 88 and the lower housing 24.

Figure 2:
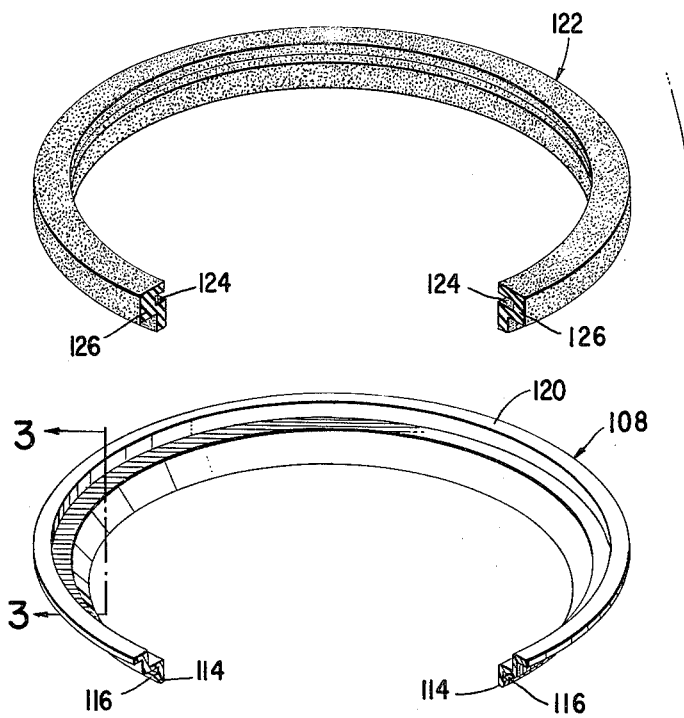
FIG. 2 is an exploded prospective view of a filter assembly as used in the cleaner in FIG. 1 and constructed in accordance with one embodiment of the present invention.
Figure 3:
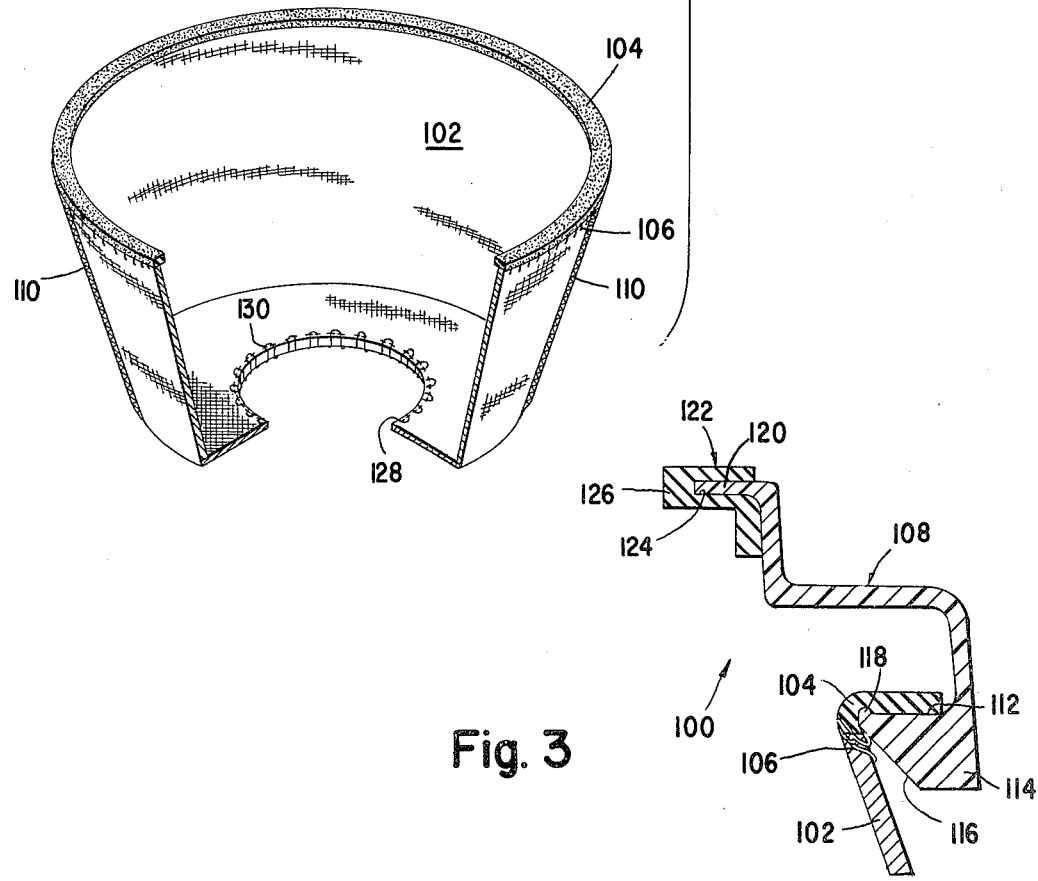
FIG. 3 is an enlarged cross-sectional view taken along line 3—3 of FIG. 2 illustrating a portion of the filter assembly constructed in accordance with the present invention.

Both a disposal paper filter (not shown) which is used only during the dry operation of the cleaner, and a cloth secondary filter assembly 100, used during both wet and dry operation, are mounted between the receptacle 22 and the housing 24 about the entire periphery thereof to protect the motor-blower unit 72 from foreign matter which may enter the inlet 74 of the blower. As best illustrated in FIGS. 2 and 3 the filter assembly includes a substantially cup-like fabric filter 102 having a rubber stripping 104 sewn to the upper periphery thereof by means of gather type stitches 106. The upper periphery of the filter 102 is thereby made elastically resilient and may be stretched to fit about a rigid hoop 108. The cup-like filter 102 may be of a hemispherical shape or of a truncated conical shape such as illustrated in the drawings in FIG. 2. All such configurations are contemplated by the term cup-like. Preferably the filter 102 is made of a plurality of cotton satine panels which are sewn together by stitching such as illustrated at 110. The hoop 108 is preferably molded of a high density polyethylene plastic material having a member of step-like portions as best illustrated in FIG. 3. The bottom of the hoop includes an annular or peripheral shelf 112 facing radially away from the center of the hoop and formed on the top of a thickened bottom portion 114 having an outer beveled edge 116. The resilient peripheral edge 104 of the filter is positioned on the shelf 112 and by virtue of its elasticity frictionally is maintained thereon. Since the pressure in the interior of the filter when positioned in the cleaner is less than that on the exterior of the filter the edge of the filter adjacent the stripping 104 tends to be forced into contact with bevel 116, and since the pressure differential may tend to withdraw the stripping from the shelf 112 a plurality of bumps or spikes 118 may be molded on the outer peripheral edge above the bevel wall 116. Formed on the upper peripheral edge of the hoop radially outwardly from the shelf 112 is a peripheral flange or lip 120 about which is disposed an annular seal 122. The seal, which is an extruded polyvinylchloride material, includes a groove 124 adapted to be positioned on and about the lip 120 and includes a radially outwardly extending flanged portion 126 adapted to be interposed between the groove 36 on the rim 34 of the lower housing 24 and the top peripheral portion of the dirt receptacle 22. In this manner the housing 24 may be secured to the dirt receptacle 22 without loss of suction.

The particular filter for use in combination with the vacuum cleaner of FIG. 1 includes, as clearly shown in FIG. 2, an aperture 128 in the bottom surface of the fabric through which the sensor housing 48 may extend. The aperture 128 is bordered by stitching 130 which not only binds the border of the aperture against fraying but acts in conjunction with the flange 50 of the housing 48 to form a seal. The air pressure across the filter keeps the edges of the stitching 130 tightly against the bottom of the flange section 50 to prevent unwanted dirt and other foreign materials from leakage past the filter. Moreover, the cup-shaped portion of the housing 24 includes a plurality of ribs 132 which aid in maintaining the filter shape by preventing the filter from being drawn against the surfaces of the housing due to the pressure differential across the filter, and a plurality of ribs 134 may be formed about the top of the flange 50 to eliminate the possibility of the filter cloth disturbing the airflow pattern in the vicinity of the aperture 40.

In operation, liquid and/or foam entering the inlet 30 is baffled downwardly and dropped into the bottom of the receptacle 22. When the level of the liquid and/or foam reaches that of the float 56, the float is lifted until the valve 62 closes off the opening 40 in the neck 42. This shuts off the inlet airflow and the change in sound alerts the operator to shut off the cleaner. Since the float 56 is below the level of the filter and it actuates the valve 62 prior to the liquid and/or foam level in the container 22 reaching the elevation of the filter, the filter is prevented from becoming wet as was the case in the prior art.

Figure 4:
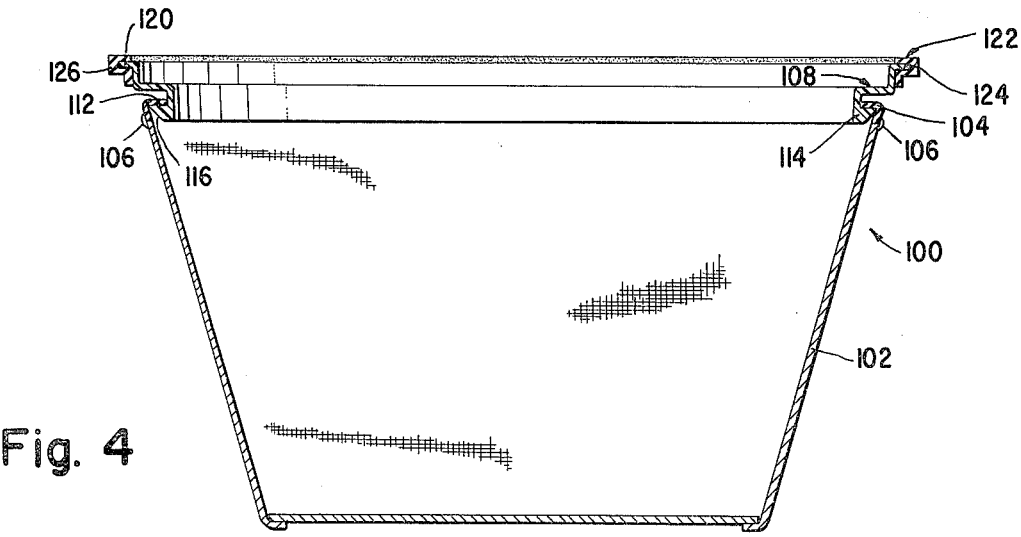
FIG. 4 is a cross-sectional view of another embodiment of the filter assembly of the present invention.

The unique construction of the filter assembly of the present invention has application to cleaners other than those designed for wet/dry operation since it provides a rigid structure which is easily positioned between the power suction module and the dirt receptacle. The filter illustrated in FIG. 4 is constructed in a manner similar to that of the filter in FIG. 2 with the sole exception that there is no bottom aperture in the FIG. 4 filter. This filter thus can be utilized in cleaners which are of the strictly dry operating type such as that disclosed in co-pending U.S. patent application Ser. No. 133,655, filed Apr. 13, 1971. It should be noted that the fabric filter may, of course, be simply removed from the hoop 108 by the ordinary user and washed when it has become excessively dirty. Positioning of the seal 122 is an easily performed operation as is the installation of a paper primary filter about the flange 126 of the seal 122.

Numerous alterations of the structure herein disclosed will suggest themselves to those skilled in the art. However, it is to be understood that the present disclosure relates to preferred embodiments of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a wet/dry suction cleaner having an open top dirt receptacle with a top periphery including an air inlet below the top periphery, a power suction module including a housing supporting a motor-blower unit supported on the top periphery of the receptacle with the motor blower unit mounted entirely within the receptacle for drawing wet and dry dirt laden air through the inlet, and air shut-off means including a liquid level sensor secured to the housing and depending into said receptacle, a filter assembly including a fabric filter disposed entirely within said receptacle between the air inlet and the intake to the motor-blower unit, said filter assembly having an annular seal interposed in abutting sandwiched relationship between the top of the receptacle and the module housing, means defining an aperture in said fabric filter through which said sensor protrudes, and means defining a seal about the border of said aperture in dirt sealing engagement with portions of said shut-off means above said sensor.

2. In a cleaner as recited in claim 1 wherein said air shut-off means comprises a sensor housing depending from said module housing, said sensor housing inlcuding on the upper portion thereof a flange of substantially the same geometrical shape as said filter aperture, said flange being larger than said aperture, said filter being disposed about said sensor housing with the border of said aperture in abutting relationship with the bottom of said flange.

3. In a cleaner as recited in claim 2 wherein said filter assembly comprises a fabric filter having a resilient upper peripheral edge, said resilient edge being disposed about a rigid hoop, said annular seal being disposed about said hoop above said resilient edge.

4. In a cleaner as recited in claim 3 wherein said hoop includes a peripheral shelf for positionally seating said resilient edge, and a peripheral lip above said shelf, said seal including a peripheral groove positioned about said lip.

5. In a cleaner as recited in claim 3 wherein the border of said aperture inlcudes sewn stitches providing a seal with said flange.

6. In a cleaner as recited in claim 5 wherein said resilient peripheral edge comprises rubber stripping sewn to said fabric.

7. A filter assembly for a utility vacuum cleaner having an open top dirt receptacle, a power suction module including a housing having a peripheral edge mating with the top of the receptacle, and air shut-off means including a liquid level sensor supported by the housing and depending into the receptacle, said assembly comprising a substantially cup-like fabric filter having a resilient rubber striping on the upper peripheral edge, said resilient edge being disposed about a rigid molded synthetic plastic hoop having a peripheral shelf for positionally seating said resilient edge, a peripheral lip formed on said hoop above said shelf, an annular seal including a peripheral groove within which said lip is received, said seal being adapted to be interposed between said housing peripheral edge and the top of said receptacle, and means defining a sensor receiving aperture in the bottom of said fabric filter, the border of said aperture including stitching means adapted to provide a seal with an annular portion of said shut-off means.

\* \* \* \* \*